(12) United States Patent
Hepner et al.

(10) Patent No.: US 7,320,130 B2
(45) Date of Patent: Jan. 15, 2008

(54) MUTUAL EXCLUSION LOCK IMPLEMENTATION FOR A COMPUTER NETWORK

(75) Inventors: Daniel W. Hepner, Saratoga, CA (US); Eric M. Soderberg, Mountain View, CA (US); Bruce Campbell, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 929 days.

(21) Appl. No.: 10/395,090

(22) Filed: Mar. 25, 2003

(65) Prior Publication Data

US 2004/0194092 A1 Sep. 30, 2004

(51) Int. Cl.
*G06F 9/46* (2006.01)
*H04L 9/00* (2006.01)

(52) U.S. Cl. ...................... 718/100; 713/166
(58) Field of Classification Search ................ 718/104, 718/102, 100; 713/166
See application file for complete search history.

(56) References Cited

U.S. PATENT DOCUMENTS

| 5,592,673 | A | * | 1/1997 | Kurabayashi et al. | ........ 710/200 |
| 5,655,085 | A | * | 8/1997 | Ryan et al. | ..................... 705/4 |
| 5,761,403 | A | * | 6/1998 | Yamagishi | ................... 714/13 |
| 5,896,523 | A | * | 4/1999 | Bissett et al. | ............... 713/400 |
| 6,779,121 | B1 | * | 8/2004 | Uchida et al. | ................. 726/19 |
| 2002/0023259 | A1 | * | 2/2002 | Shimizu et al. | ............. 717/126 |
| 2003/0149935 | A1 | * | 8/2003 | Takizawa et al. | ........... 715/513 |

* cited by examiner

*Primary Examiner*—Meng-Al T. An
*Assistant Examiner*—Camquy Truong

(57) ABSTRACT

A system and methods are disclosed for preventing computers in a network from concurrently processing a task, where the task can be successfully processed by only one computer in the network at a time. The system comprises a plurality of computers connected to the network and a locking device connected to the network, wherein the locking device uses a password change system to control which computer in the network is able to process the task.

13 Claims, 3 Drawing Sheets

MUTUAL EXCLUSION LOCK IMPLEMENTATION FOR A COMPUTER NETWORK

TECHNICAL FIELD

The technical field is mutual exclusion lock implementation for a computer network.

BACKGROUND

In a computer network there are occasions when two or more computers in the network inadvertently attempt to complete the same task, such as operating a software application or processing data, at the same time. However, in situations where the task can be correctly performed by only one computer at a time, deleterious results may ensue from having two or more computers in the network processing or attempting to process the same task. In order to avoid this problem, computer systems commonly employ mutual exclusion locks.

One application of mutual exclusion lock implementation is high availability environments for computer networks. In a high availability environment, it is often critical that a software application operating on the computer network be operational at all times. In such cases, if one computer in the network is running the application and subsequently fails, then another computer in the network takes over and runs the application. However, a significant problem arises when another computer in the network attempt to take over and run the application concurrently with the first computer. This scenario has serious potential for corrupting databases.

One solution to this problem is to use a disk drive accessible to each computer in the network and an algorithm that runs through a series of reads and writes on the disk drive. The algorithm eventually yields which computer in the network will run the application. Another solution involves the use of an external computer. In the specific case of two computers A and B competing to run the application, a third computer arbitrates between the two competing computers. If both computer A and B are alive, they contact the third computer, which will then determine which computer will run the application. However, these current methods may be economically unacceptable and may require a network configuration that is undesirable or require additional hardware.

Accordingly, a need exists for an alternate system and method for mutual exclusion lock implementation that may be used in a variety of applications that is relatively inexpensive and simple.

SUMMARY

A system is disclosed for preventing computers in a network from concurrently processing a task, where the task can be successfully processed by only one computer in the network at a time. The system comprises a plurality of computers connected to the network and a locking device connected to the network, wherein the locking device uses a password change system to control which computer in the network is able to process the task.

A method is disclosed for preventing a second computer from concurrently operating a software application already operating on a first computer. A first password is assigned to the first computer and a second password is assigned to the second computer, and a locking device password is assigned to a locking device, the first computer and the second computer. The method comprises detecting a failure of the first computer by the second computer, supplying the locking device password and the second password from the second computer to the locking device, comparing the locking device password and a currently existing password of the locking device and changing the currently existing password of the locking device to the second password if the locking device password matches the currently existing password of the locking device, whereby the second computer operates the software application exclusively in the network.

A method is disclosed for preventing computers in a network from concurrently processing a task, where the task can be successfully processed by only one computer in the network at a time. The method comprises acquiring a locking device if a first password of a computer in the network matches a currently existing password of the locking device, whereby the computer is able to process the task exclusively in the network, or denying acquisition of the locking device if the first password does not match the currently existing password of the locking device.

DESCRIPTION OF THE DRAWINGS

The detailed description will refer to the following drawings, wherein like numerals refer to like elements, and wherein.

DETAILED DESCRIPTION

Figure 1:
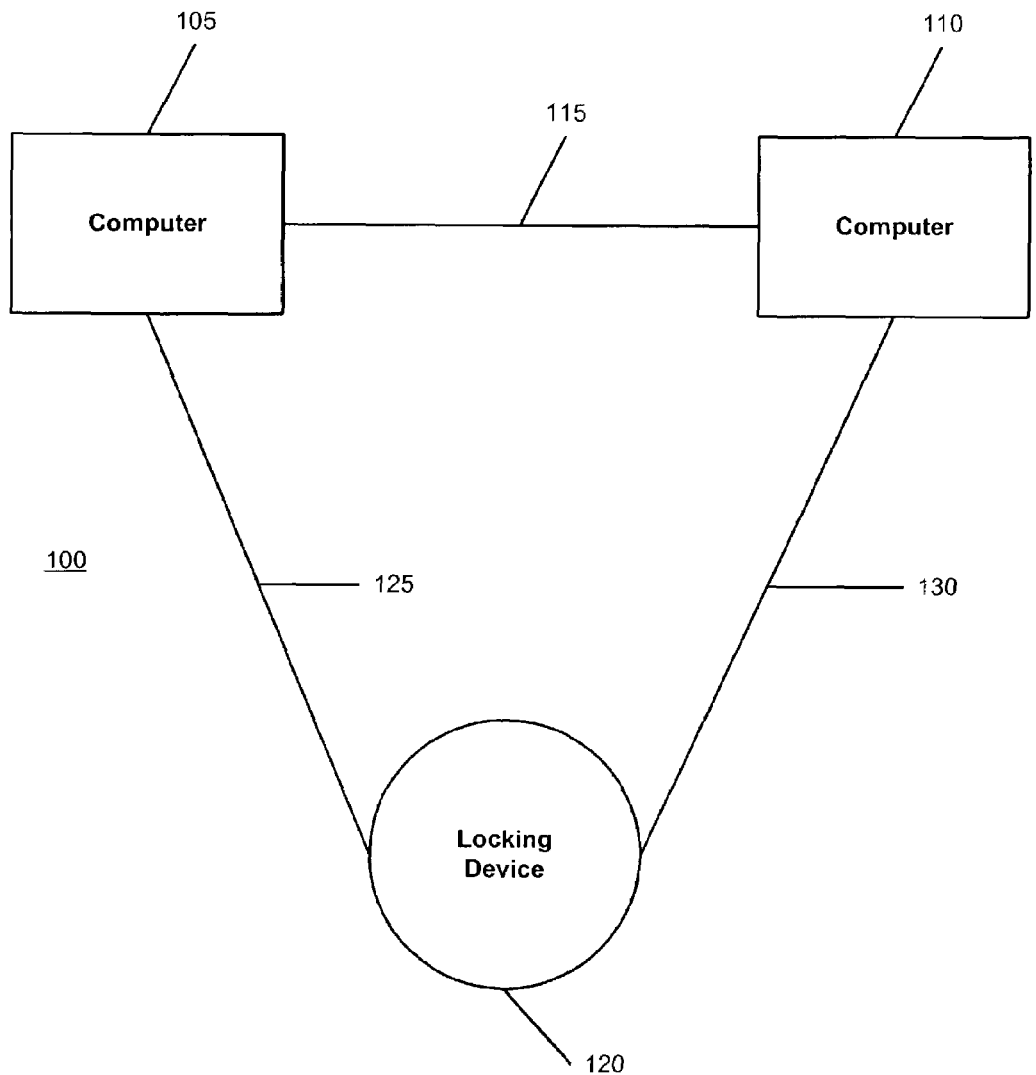
FIG. 1 illustrates one embodiment of a computer network with a high availability environment.

FIG. 1 illustrates one embodiment of a computer network 100 in a high availability environment. Only two computers are shown, but it is understood that more computers may be included in the computer network 100. A first computer 105 and a second computer 110 are connected to each other by a communication link 115. Both computers 105, 110 are connected to a locking device 120 by communication links 125, 130, respectively. The communication links 115, 125, 130 may be physical links, such as conventional land-based copper lines or fiber optic cables, or the communication links may be wireless links. The two computers 105, 110 communicate with each other through communication link 115, and engage and communicate with the locking device 120 through the communication links 125, 130, respectively. The locking device 120 has a locking device password that can be changed. The two computers 105, 110 are each assigned their own unique passwords as well as the locking device password so that each computer in the computer network 100 possesses two passwords. The two computers 105, 110 may be ordinary personal computer systems or computer server systems, or a combination of a personal computer system and a computer server system, that are each capable of operating software applications and communicating with entities within the computer network 100.

The locking device 120 controls access for operating a software application on the computer network 100 through a password change system, which is described below in FIG. 2. One function of the locking device 120 is to allow any one computer in the computer network 100 to operate the software application, while excluding any other computers in the computer network 100 from operating the software application on a concurrent basis. If the computers in the computer network 100 are in communication with each other, an intelligent agreement can be made as to which computer will run the application. However, if the computers lose communication with each other, the locking device 120 is needed to resolve which computer should run the application. The locking device 120 may be one of a number of commonly available devices that allow passwords to be set and changed. For example, the locking device 120 may be a hardware firewall device that is connected to the computer network 100.

Each computer in the computer network 100 is capable of engaging the locking device 120 and supplying the unique password of that computer and the locking device password to the locking device 120. The locking device 120 compares the supplied locking device password from the computer with a currently existing password of the locking device 120. If the passwords match, the computer supplies its unique password to the locking device 120 and the currently existing password of the locking device 120 is changed to the unique password of the computer. The computer has acquired the locking device 120 after the currently existing password of the locking device 120 has been changed to the unique password of the computer. This change of the currently existing password of the locking device 120 is atomic with respect to the matching of the supplied locking device password with the currently existing password of the locking device 120. In other words, the matching of the passwords instantaneously results in a change of the currently existing password of the locking device 120 to the unique password of the computer. Once a computer in the computer network 100 has acquired the locking device 120, it maintains its status of having acquired the locking device 120, or holds the locking device 120, until the computer experiences failure or releases the locking device 120. A computer holding the locking device 120 will normally release the locking device 120 when all computers in the computer network 100 are able to communicate with each other.

In some unusual events, such as the destruction of a computer holding the locking device 120, it will be impossible for the destroyed computer to release the locking device 120. This requires a special administrative action to clear the locking device 120, and make it available to other computers in the computer network 100. For example, if any computer in the computer network 100 holding the locking device 120 experiences permanent failure, the currently existing password of the locking device 120 is cleared and changed to the locking device password. The currently existing password of the locking device 120 may be cleared, for example, by a surviving computer that is selected by a manager of the computer network 100. The manager initiates the clearing process in a selected surviving computer after a permanent failure of the computer holding the locking device 120 is detected. The manager may detect a permanent failure of the computer by physically inspecting the computer for indications that it is no longer operating properly. The manager may be, for example, a human administrator. The selected surviving computer may, for example, clear the currently existing password of the locking device 120 by supplying the password of each computer in the computer network 100 to the locking device 120 until the currently existing password of the locking device 120 is matched. Upon matching the currently existing password of the locking device 120, the selected surviving computer may change the currently existing password of the locking device 120 to the locking device password. This enables the locking device 120 to be acquired by any computer.

In one embodiment, the first computer 105 initially operates the software application on an exclusive basis in the computer network 100. The initial state of the locking device 120 is available, such that any computer in the computer network 100 other than the first computer 105 may acquire the locking device 120. Since the computers in the computer network 100 are in communication with each other, the locking device 120 is not initially held by any computer. In this case, the currently existing password of the locking device 120 is the locking device password. In a high availability environment, if the first computer 105 experiences failure, or appears to experience failure from the perspective of the second computer 110, the second computer 110 will detect a failure in the first computer 110 and will attempt to acquire the locking device 120 in order to take over the operation of the software application. If the first computer 105 has not failed but the communication link 115 is broken or interrupted, the computer 105 will also compete to acquire the locking device 120. Only one of the computers 105 and 110 will succeed in acquiring the locking device 120 based on priority in time. The computer which successfully acquires the locking device 120 runs the software application.

Figure 2:
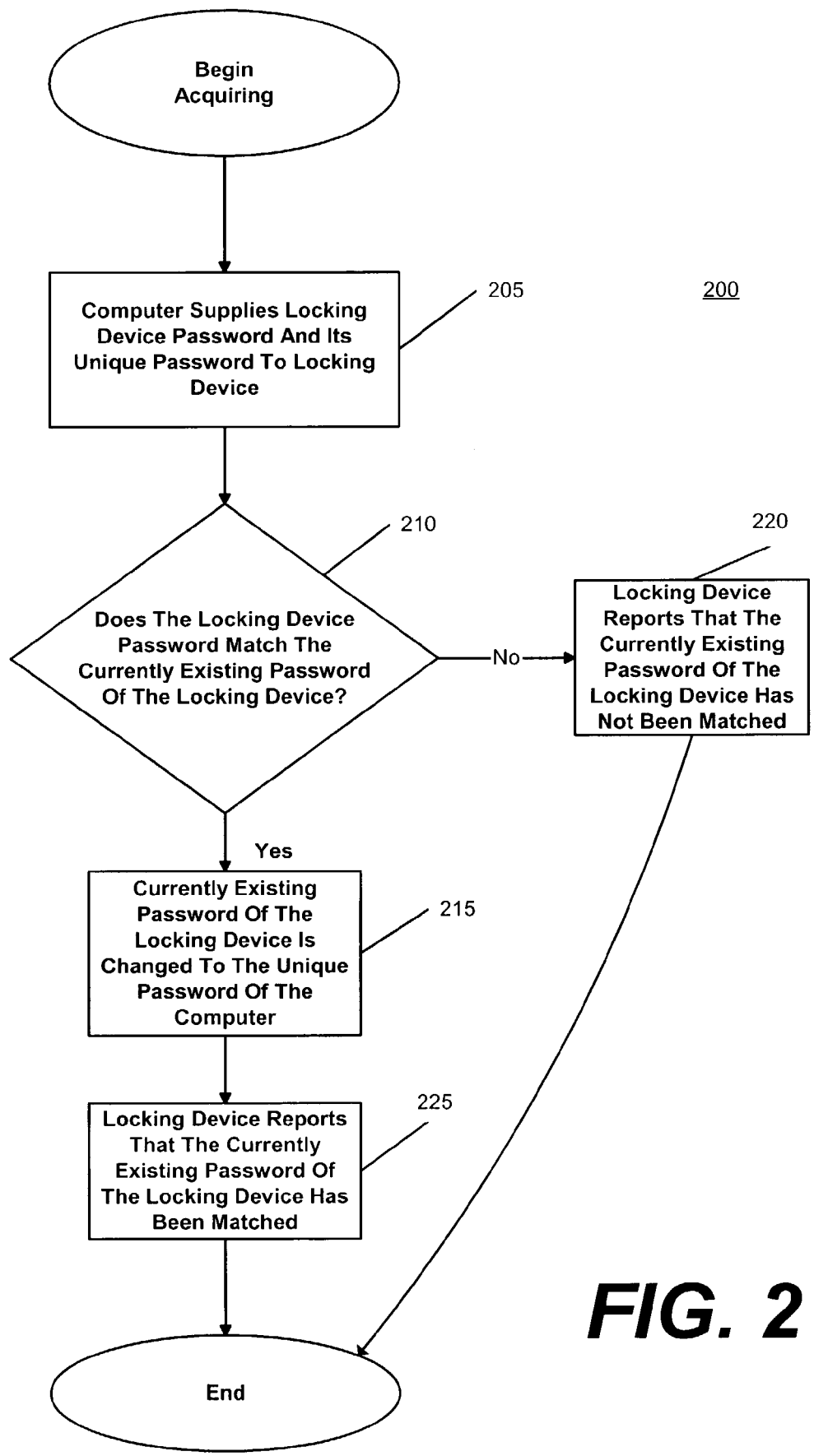
FIG. 2 is a flow chart illustrating how a computer acquires a locking device utilizing a password change system in the computer network of FIG. 1.

The locking device 120 is acquired using the method illustrated by the flowchart 200 of FIG. 2. For example, it is possible that the second computer 110 succeeds in acquiring the locking device 120 before the first computer 105. In this situation, the computer 110 engages the locking device 120 through communication link 130 and supplies the locking device password and its unique password to the locking device 120, step 205. If the locking device password matches the currently existing password of the locking device 120, step 210, then the currently existing password of the locking device 120 is changed to the unique password of the computer 110, step 215. The locking device 120 reports to the computer 110 that the currently existing password of the locking device 120 has been matched, step 225. The computer 105, which has also competed for the locking device 120, will be denied access by the locking device 120 since the computer 110 acquires the locking device 120 first. The supplied locking device password supplied by the computer 105 to the locking device 120 will not match the currently existing password of the locking device 120 (i.e. the unique password of the computer 110), and the computer 105 will not be permitted to operate the software application. Upon denial of access, the locking device 120 reports to the computer 105 that the currently existing password of the locking device 120 has not been matched, step 220. The computer that first successfully acquires the locking device 120 will operate the software application exclusively.

Figure 3:
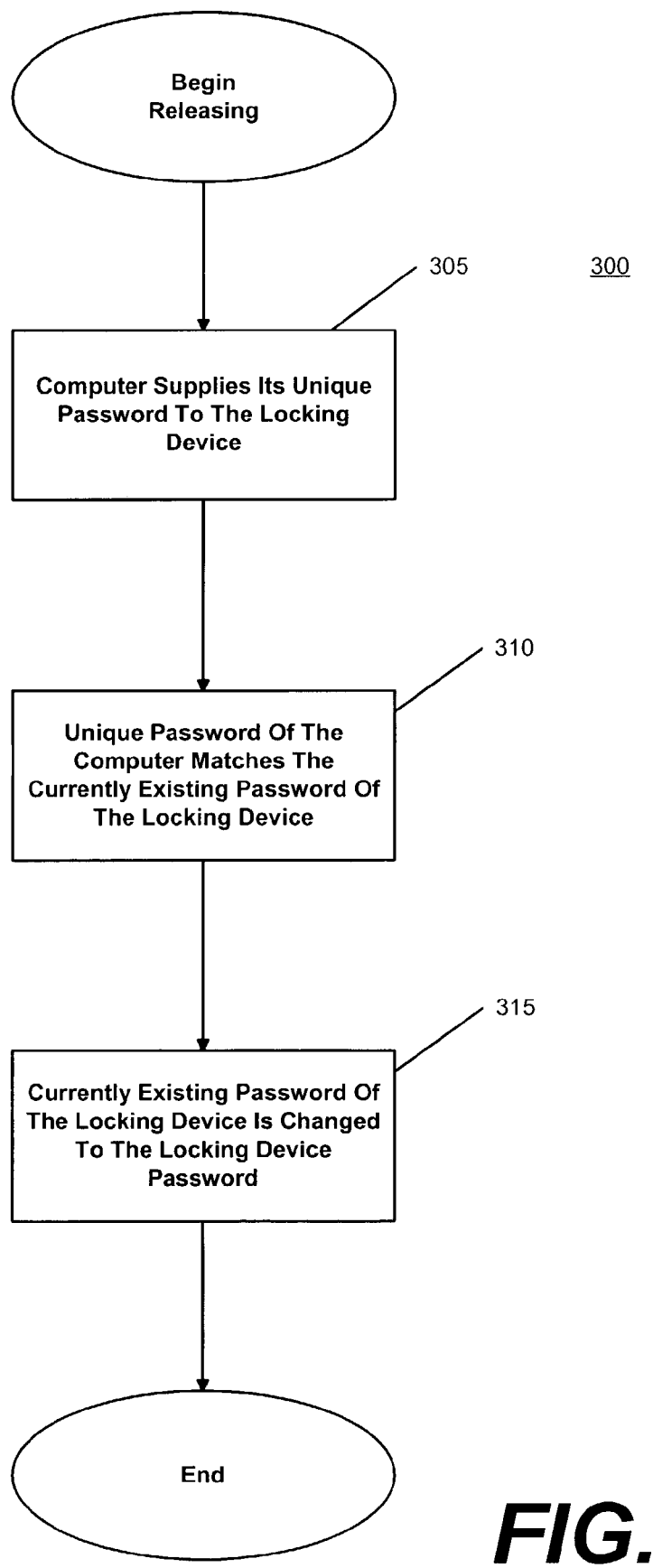
FIG. 3 is a flow chart illustrating a release of the locking device after the locking device has been acquired.

After acquiring the locking device 120, and upon resumption of communication between all computers in the computer network 100, the locking device 120 may be released by the method illustrated by the flow chart 300 of FIG. 3. For example, the second computer 110 may engage the locking device 120 through communication link 130 and supply the unique password of the second computer 110, step 305. The unique password of the second computer 110 will match the currently existing password of the locking device 120, step 310, because the second computer 110 holds the locking device 120. The currently existing password of the locking device 120 is then changed to the locking device password, step 315. Any other computer in the computer network 100 may acquire the locking device 120 since each computer is assigned and is capable of supplying the locking device password along with its own unique password.

It is understood that this embodiment may be applied not only to high availability environments in computer networks, but also to other situations that would benefit from mutual exclusion lock implementation. In these situations, computers in a computer network 100 are not backing each other up as in the case for high availability, but are independent components in the computer network 100 that have access to the same task or resource. If one of the computers is processing the task, the other computers in the computer network 100 are prevented from concurrently processing the same task by the locking device 120 that uses a password change system. The computer acquiring the locking device 120 is able to process the task exclusively in the network. The locking device 120 may be acquired and released according to the methods illustrated in FIGS. 2 and 3, respectively. Therefore, the locking device 120 controls which computer in the network is able to utilize the resource or process the task at a given time.

While the present invention has been described in connection with an exemplary embodiment, it will be understood that many modifications will be readily apparent to those skilled in the art, and this application is intended to cover any variations thereof.

What is claimed is:

1. A method for preventing a computer from concurrently operating a software application already operating on another computer, wherein a first password is assigned to a first computer and a second password is assigned to a second computer, and wherein a locking device password is assigned to a locking device, the first computer and the second computer, the method comprising:
    (a) detecting a failure of the first computer by the second computer;
    (b) supplying the locking device password and the second password from the second computer to the locking device;
    (c) comparing the locking device password and a currently existing password of the locking device;
    (d) changing the currently existing password of the locking device to the second password if the locking device password matches the currently existing password of the locking device, wherein the second computer operates the software application exclusively in a network and wherein another computer is prevented from concurrently operating the software application; and
    (e) releasing the locking device by the second computer by changing the currently existing password of the lockin device from the second password to the locking device password.

2. The method of claim 1, where the releasing the locking device step further comprises:
    supplying the second password and the locking device password to the locking device from the second computer;
    comparing the second password and the currently existing password of the locking device; and
    changing the currently existing password of the locking device to the locking device password.

3. A system for preventing computers in a network from concurrently processing a task or accessing data, the system comprising:
    a plurality of computers connected to the network, wherein each computer of the plurality of computers is assigned a unique password and a locking device password; and
    a locking device connected to the network, wherein the locking device has a currently existing password and the locking device is adapted to receive a request from a computer from the plurality of computers to access the task or data, and wherein the locking device is adapted to compare the locking device password of the computer with the currently existing password and if there is a match, the currently existing password of the locking device is changed to the unique password of the computer and the computer has exclusive access to the task or data, and wherein the exclusive access to the task or data is released by changing the currently existing password of the locking device from the unique password to the locking device password.

4. The system of claim 3, wherein the computer is adapted to release exclusive access to the task or data by supplying the unique password of the computer to the locking device and wherein the locking device is adapted to compare the supplied unique password with the currently existing password and if there is a match, the currently existing password of the locking device is changed from the unique password to the locking device password and the exclusive access to the task or data by the computer is released.

5. The system of claim 3, wherein the locking device is adapted to deny access to the task or data requested by the computer if the locking device password of the computer does not match the currently existing password of the locking device.

6. The system of claim 5, wherein the locking device is adapted to provide a report to the computer, wherein the report indicates that the locking device password of the computer does not match the currently existing password of the locking device.

7. The system of claim 3, wherein the locking device comprises a hardware firewall.

8. The system of claim 3, wherein the locking device comprises:
    a password change system to control access to the task or data by the plurality of computers connected to the network.

9. The system of claim 3, wherein the plurality of computers in the network comprise a combination of personal computer systems and computer server systems capable of processing the task or storing the data, and communicating with other personal computer systems and computer server systems in the network and the locking device.

10. A computer readable medium containing instructions for preventing computers in a network from concurrently processing a task or accessing data, by:
    receiving a request to access the task or data from a computer in the network, wherein the request comprises a unique password and a locking device password assigned to the computer;
    comparing the locking device password assigned to the computer with a currently existing password associated with a locking device, wherein the locking device controls access to the task or data and prevents multiple computers in the network from concurrently accessing the task or data;
    changing the currently existing password of the locking device to the unique password of the computer if the locking device password assigned to the computer matches the currently existing password associated with the locking device;
    permitting exclusive access to the task or data by the computer; and releasing exclusive access to the task or data by the comouter by changing the currently existing password of the locking device from the unique password to the locking device password.

11. The computer readable medium of claim 10, further comprising:
  releasing exclusive access to the task or data by the computer, wherein the releasing comprises:
  receiving the unique password assigned to the computer;
  comparing the received unique password with the currently existing password of the locking device;
  changing the currently existing password of the locking device from the unique password to the locking device password if there is a match between the received unique password and the currently existing password of the locking device; and releasing exclusive access to the task or data by the computer.

12. The computer readable medium of claim 10, further comprising:
  denying access to the task or data requested by the computer if the locking device password of the computer does not match the currently existing password of the locking device.

13. The computer readable medium of claim 12, further comprising:
  providing a report to the computer, wherein the report indicates that the locking device password of the computer does not match the currently existing password of the locking device.

* * * * *

UNITED STATES PATENT AND TRADEMARK OFFICE
CERTIFICATE OF CORRECTION

| | | |
|---|---|---|
| PATENT NO. | : 7,320,130 B2 | Page 1 of 1 |
| APPLICATION NO. | : 10/395090 | |
| DATED | : January 15, 2008 | |
| INVENTOR(S) | : Daniel W. Hepner et al. | |

It is certified that error appears in the above-identified patent and that said Letters Patent is hereby corrected as shown below:

In column 5, line 50, in Claim 1, delete "lockin" and insert -- locking --, therefor.

In column 7, line 2, in Claim 10, delete "comouter" and insert -- computer --, therefor.

Signed and Sealed this

Seventeenth Day of June, 2008

JON W. DUDAS
*Director of the United States Patent and Trademark Office*